(12) United States Patent
Kim (10) Patent No.: US 10,797,305 B2
(45) Date of Patent: Oct. 6, 2020

(54) ELECTRODE HAVING BILAYER STRUCTURE AND METHOD FOR MANUFACTURING THE SAME

(71) Applicant: LG Chem, Ltd., Seoul (KR)

(72) Inventor: Hyuk-Su Kim, Daejeon (KR)

(73) Assignee: LG Chem, Ltd. (KR)

( * ) Notice: Subject to any disclaimer, the term of this patent is extended or adjusted under 35 U.S.C. 154(b) by 26 days.

(21) Appl. No.: 15/775,273

(22) PCT Filed: Mar. 15, 2017

(86) PCT No.: PCT/KR2017/002811
§ 371 (c)(1),
(2) Date: May 10, 2018

(87) PCT Pub. No.: WO2017/160085
PCT Pub. Date: Sep. 21, 2017

(65) Prior Publication Data
US 2018/0337396 A1    Nov. 22, 2018

(30) Foreign Application Priority Data

Mar. 16, 2016    (KR) .......................... 10-2016-0031556

(51) Int. Cl.
*H01M 4/13*    (2010.01)
*H01M 4/139*    (2010.01)
(Continued)

(52) U.S. Cl.
CPC ............ *H01M 4/139* (2013.01); *H01M 4/043* (2013.01); *H01M 4/0404* (2013.01); *H01M 4/13* (2013.01);
(Continued)

(58) Field of Classification Search
CPC .......... H01M 4/139; H01M 4/04; H01M 4/36; H01M 4/13; H01M 4/0404; H01M 4/131;
(Continued)

(56) References Cited

U.S. PATENT DOCUMENTS

2004/0157130 A1*    8/2004 Ohsawa ................ H01M 4/364
                                                              429/303
2010/0028767 A1    2/2010 Inose et al.
(Continued)

FOREIGN PATENT DOCUMENTS

JP        H0275155 A      3/1990
JP        200135482 A     2/2001
(Continued)

OTHER PUBLICATIONS

JP 2009283452 MP (Year: 2009).*
(Continued)

*Primary Examiner* — Alexander Usyatinsky
(74) *Attorney, Agent, or Firm* — Lerner, David, Littenberg, Krumholz & Mentlik, LLP (57) ABSTRACT

Provided is an electrode for a secondary battery having an electrode current collector either surface or both surfaces of which are coated with two active material layers, the electrode including: an electrode current collector; a first layer of active material coated on the current collector; and a second layer of active material coated on the first layer of active material, wherein a plurality of craters are formed in the first layer of active material and the craters are filled with active material of the second layer. A method for manufacturing the electrode for a secondary battery is also provided, and the method includes carrying out laser ablation on the first layer of active material. According to the present disclosure, it is possible to solve the problem of detachment of the active
(Continued)

material layers, particularly the second layer of active material, during the process for manufacturing the electrode.

16 Claims, 3 Drawing Sheets

(51) Int. Cl.
| | | |
|---|---|---|
| *H01M 4/04* | (2006.01) | |
| *H01M 4/36* | (2006.01) | |
| *H01M 4/133* | (2010.01) | |
| *H01M 4/131* | (2010.01) | |
| *H01M 4/02* | (2006.01) | |

(52) U.S. Cl.
CPC ............ *H01M 4/131* (2013.01); *H01M 4/133* (2013.01); *H01M 4/366* (2013.01); *H01M 2004/021* (2013.01)

(58) Field of Classification Search
CPC ...... H01M 4/133; H01M 4/366; H01M 4/043; H01M 2004/021
See application file for complete search history.

(56) References Cited

U.S. PATENT DOCUMENTS

| | | | | |
|---|---|---|---|---|
| 2011/0003208 A1* | 1/2011 | Hiraoka | ................ | H01M 4/362 |
| | | | | 429/231.95 |
| 2013/0049228 A1* | 2/2013 | Nam | ....................... | H01L 25/50 |
| | | | | 257/777 |
| 2013/0095380 A1* | 4/2013 | Affinito | ............... | C23C 14/0641 |
| | | | | 429/207 |
| 2016/0172670 A1* | 6/2016 | Friend | .................. | H01M 4/134 |
| | | | | 429/231.8 |
| 2016/0204428 A1* | 7/2016 | Sugawara | ............... | H01M 4/13 |
| | | | | 429/217 |

FOREIGN PATENT DOCUMENTS

| | | | |
|---|---|---|---|
| JP | 2004234878 | * | 8/2004 |
| JP | 2004234878 A | | 8/2004 |
| JP | 2009283452 A | | 12/2009 |
| JP | 201034009 A | | 2/2010 |
| JP | 2010238426 A | | 10/2010 |
| JP | 2013030410 A | | 2/2013 |
| JP | 201397925 A | | 5/2013 |
| JP | 2014120404 A | | 6/2014 |
| JP | 201515147 A | | 1/2015 |
| KR | 20140070751 A | | 6/2014 |
| KR | 20150040429 A | | 4/2015 |
| KR | 20150082958 A | | 7/2015 |
| WO | WO2015045385 | * | 2/2014 |
| WO | 2015045385 A1 | | 4/2015 |

OTHER PUBLICATIONS

JP 2013097925 (Year: 2013).*
Decision to grant European Patent issued by EPO (Year: 2019).*
Extended European Search Report for Application No. EP17766986.8 dated Aug. 21, 2018.
Search report from International Application No. PCT/KR2017/002811, dated Jun. 30, 2017.

* cited by examiner

ELECTRODE HAVING BILAYER STRUCTURE AND METHOD FOR MANUFACTURING THE SAME

CROSS-REFERENCE TO RELATED APPLICATIONS

The present application is a national phase entry under 35 U.S.C. § 371 of International Application No. PCT/KR2017/002811 filed Mar. 15, 2017, which claims priority to Korean Patent Application No. 10-2016-0031556 filed on Mar. 16, 2016, the disclosures of which are incorporated herein by reference.

TECHNICAL FIELD

The present disclosure relates to an electrode having a bilayer structure and a method for manufacturing the same.

BACKGROUND ART

As technological development and a need for mobile instruments have increased, a demand for secondary batteries as energy sources has increased rapidly. Among such secondary batteries, lithium secondary batteries having high energy density and driving voltage, long cycle life and a low self-discharging rate have been commercialized and used widely.

In addition, recently, as the attention to environmental problems has increased, there has been grown the market of systems using a high-capacity battery, such as electric vehicles (EV) and hybrid electric vehicles (HEV) capable of substituting for vehicles using fossil fuel, including gasoline vehicles and diesel vehicles, one of the main causes of air pollution. Thus, as a power source for such electric vehicles (EV) and hybrid electric vehicles (HEV), a lithium secondary battery having high energy density, high discharge voltage and output stability has been studied and used generally.

Recently, such a lithium secondary battery tends to have an increased area and thickness in order to provide high capacity and high density, resulting in an increase in applied current. For solving such problem, there has been suggested an electrode formed to have two layers of active material so that one layer of active material may be a high-power layer which ensures a high transport rate of lithium ions and the other layer of active material may be a high-energy layer which ensures high energy density. An embodiment of the electrode is shown in FIG. 2a.

Figure 2A:
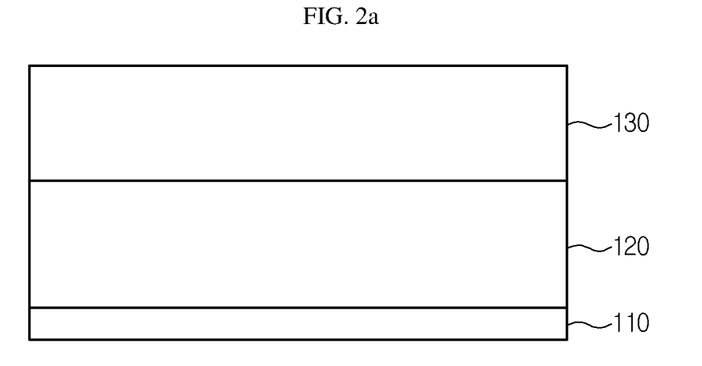
FIG. 2a is a schematic sectional view illustrating a conventional electrode having two active material layers.

Referring to FIG. 2a, a first layer 120 of active material is formed on an electrode current collector 110, and a second layer 130 of active material is formed on the first layer 120 of active material. According to the conventional method for manufacturing such an electrode, first electrode mixture slurry is coated onto the electrode current collector, followed by drying and pressing. Then, second electrode mixture slurry is coated onto the first layer of active material, followed by drying and pressing. During the above-mentioned process, the electrode current collector having the active material layers formed thereon is repeatedly subjected to a process in which it is conveyed along the processing line, wound for the convenience in storage and unwound to go to the process. In the process, a problem has been generated in that the first layer of active material coated and dried on the electrode current collector is detached therefrom or the second layer of active material coated and dried on the first layer of active material is detached therefrom. Particularly, there has been a severe problem that the second layer of active material is detached before carrying out pressing after the second electrode mixture slurry is coated on the first layer of active material.

DISCLOSURE

Technical Problem

The present disclosure is designed to solve the problems of the related art and to solve the technical problems required to be solved from the past.

In one aspect, the present disclosure is directed to providing an electrode which minimizes or prevents a problem of detachment of active material layers in an electrode having two layers of active material in a stacked configuration during its conveying.

In another aspect, the present disclosure is directed to providing a method for manufacturing the electrode with high productivity.

Technical Solution

In one aspect of the present disclosure, there is provided an electrode for a secondary battery having an electrode current collector either surface or both surfaces of which are coated with two active material layers, the electrode comprising: an electrode current collector; a first layer of active material coated on the current collector; and a second layer of active material coated on the first layer of active material, wherein a plurality of craters are formed in the first layer of active material and the craters are filled with active material of the second layer.

The craters may have a diameter of 2-60 μm.

The craters may have a depth of 2-60 μm.

The craters may have a semi-spherical shape or a flower-like shape having a plurality of petals.

The craters may occupy 1-50% of the surface area of the first layer of active material.

In another aspect of the present disclosure, there is also provided a method for manufacturing an electrode for a secondary battery having an electrode current collector either surface or both surfaces of which are coated with two active material layers, the method including the steps of: (i) preparing first electrode mixture slurry for forming a first layer of active material and coating the first electrode mixture slurry onto the electrode current collector, followed by drying; (ii) carrying out pressing to form the first layer of active material; (iii) forming craters in the first layer of active material; (iv) preparing second electrode mixture slurry for forming a second layer of active material and coating the second electrode mixture slurry onto the first layer of active material, followed by drying; and (v) carrying out pressing.

The craters may be formed in the first layer of active material by laser ablation.

The laser may be IR laser, eximer laser, YAG laser or $CO_2$ laser.

The laser may have an output of 0.1-20 W.

The laser ablation may be carried out at a speed of 2,500 mm/s or less.

The pressing may be carried out by a roll press in steps (ii) and (v).

Advantageous Effects

The electrode for a secondary battery including two layers according to an embodiment of the present disclosure has a structure in which craters are formed in a first layer of active material at the interface between the first layer of active material and a second layer of active material and the craters are filled with active material of the second layer. Herein, an anchor effect is generated between the first layer of active material and the second layer of active material by virtue of the craters so that the binding of the first layer of active material with the second layer of active material may be formed more firmly. Thus, a problem of separation of the second layer of active material that occurs during the manufacturing process is also solved.

In addition to the physical anchor effect derived from the craters, formation of craters using laser makes a part of the active material irradiated with laser melt to provide a smooth surface. Thus, the contact area between the first layer of active material and the second layer of active material is increased so that the binding of the first layer of active material with the second layer of active material may be formed more firmly.

In the electrode according to an embodiment of the present disclosure, it has a bilayer structure in which the first layer of active material is configured to provide high output and the second layer of active material is configured to provide high energy. In this case, since the second active material particles are introduced to the craters formed by laser ablation, the reaction distribution in the vertical direction of the electrode may be accomplished more uniformly. Such an effect becomes more significant when the laser output is increased to maximize the ablation depth. When the high-output electrode layer of the second layer of active material is formed to the vicinity of the interface with the electrode current collector, the output characteristics are improved, the reaction distribution in the vertical direction of the electrode becomes more uniform, and life characteristics are also improved.

In addition, the laser ablation may be carried out while the electrode current collector having the first layer of active material formed thereon is conveyed. In this case, the whole process for manufacturing the electrode can be carried out in an in-line mode, and thus the process productivity can be improved significantly.

Further, even before the second layer of active material coated on the first layer of active material is pressed, the active material of the second material is anchored to the craters in the first layer of active material, and thus it is possible to prevent detachment or separation of the active material layer while conveying the electrode before pressing the second layer of active material and after applying the second layer of active material.

BEST MODE

In one aspect of the present disclosure, there is provided an electrode for a secondary battery having an electrode current collector either surface or both surfaces of which are coated with two active material layers, the electrode comprising: an electrode current collector; a first layer of active material coated on the current collector; and a second layer of active material coated on the first layer of active material, wherein a plurality of craters are formed in the first layer of active material and the craters are filled with active material of the second layer.

The electrode for a secondary battery may include a first layer of active material formed on an electrode current collector, and a second layer of active material formed on the first layer of active material and having relatively lower press density and relatively larger average particle size as compared to the first layer of active material. Each of the active material in the first layer and the active material in the second layer may include the same or different materials having a spherical or pseudo-spherical shape, but may have another shape.

The average particle diameter of the active material forming the first layer of active material and that of the active material forming the second layer of active material may have a ratio of 1:9-5:5.1 or 1:1.625-1:4. According to a non-limiting embodiment, the active material of the first layer of active material may have an average particle diameter of about 20 μm or less, for example 10-18 μm. The average particle diameter of the active material may be determined by using a laser diffraction method. As used herein, 'average particle diameter' means the particle diameter ($D_{50}$) which is the value of the particle diameter at 50% in the cumulative distribution. Since the active material of the second layer consists of an active material having a larger particle diameter as compared to the active material of the first layer, the pores formed in the first layer of active material tends to be smaller than the particle diameter of the active material of the second layer of active material. For this, it is difficult for the active material of the second layer of active material to infiltrate into the pores of the first layer of active material and to be anchored thereto.

In addition, the press density ratio of the first layer of active material and the second layer of active material may be 1.1:1-3:1 or 2:8-5:5.1 under a pressure of 12-16 Mpa. The press density is based on the comparison of a degree of particle deformation in an active material. When the same pressure is applied for pressing, a lower press density value suggests higher compression strength. Determination of the press density of each of the first layer of active material and the second layer of active material may be carried out by using MCP-PD51, a powder resistance measuring system available from Mitsubishi Chemical. In the case of the powder resistance measuring system, a predetermined amount of active material powder is introduced to a cylinder-type load cell and force is applied thereto continuously. At that time, the density when the particles are compressed is measured. As the particles have higher strength, they are compressed less under the same pressure and thus show lower press density.

Figure 4:
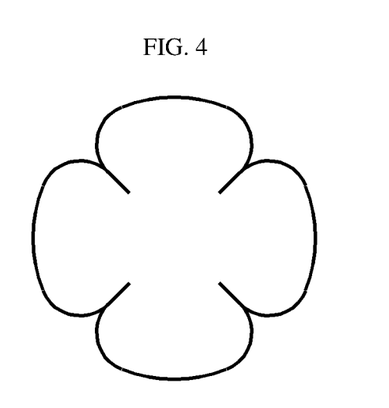
FIG. 4 is a top view illustrating flower-like shaped craters formed by laser ablation according to an embodiment of the present disclosure.

The craters formed in the first layer of active material may be designed differently depending on the diameter of the active material particles used in the second layer of active material. For example, when the active material particles used in the second layer of active material have a particle diameter of 2-30 μm, the craters formed in the first layer of active material may have the largest diameter ranging from 2 to 60 μm and the largest depth ranging from 2 to 60 μm. In addition, the craters may be adjusted according to the shape of a portion to which laser is irradiated. If necessary, the craters may have a semi-spherical shape or a flower-like shape having a plurality of petals as shown in FIG. 4, but are not limited thereto. When the craters are formed to have a flower-like shape having a plurality of petals, it is possible to provide an effect of anchoring the active material of the second layer to the first layer in the horizontal direction as well as in the vertical direction. Herein, the number of petals may be adjusted as necessary and is not particularly limited. Whole or a part (for example, a half of the spherical particle) of an active material particle which form the interface with the first layer of active material are inserted to the craters of the first layer of active material.

The craters may occupy at most 50%, such as 1-50%, of the surface area of the first layer of active material. As the surface area ratio occupied by the craters approaches 50%, anchoring portions are increased to provide an increased interfacial adhesion effect. However, since it is required to increase the number of laser ablation in order to increase the surface area ratio of the craters, the processing time is increased.

In addition, the craters may be formed to provide any pattern on the active material layer. In other words, the pattern of the craters is not particularly limited, as long as it allows an electrolyte to be transported into an electrode. For example, the craters may have a stripe pattern.

Figure 2B:
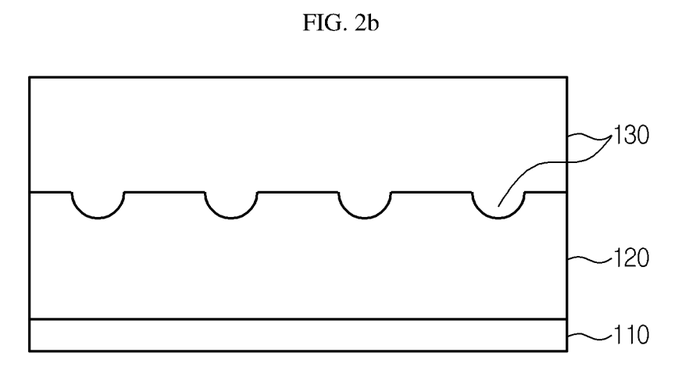
FIG. 2b is a schematic sectional view illustrating the electrode having two active material layers according to an embodiment of the present disclosure.

FIG. 2b is a schematic sectional view of the electrode for a secondary battery. Referring to FIG. 2b, a first layer of active material 120 is formed on an electrode current collector 110, and a plurality of craters having a concave up semi-spherical shape is formed in the first layer of active material. In addition, a second layer of active material 130 is formed on the first layer of active material, and the craters are filled with the active material 130 of the second layer of active material. Thus, since the two active material layers are stacked on the first layer of active material so that the craters of the first layer of active material 120 are engaged with the interface of the second layer of active material 130, it is possible to obtain an excellent interfacial adhesion effect between the first electrode active material layer and the second layer of active material in the electrode for a secondary battery according to the present disclosure.

In another aspect of the present disclosure, there is provided a method for manufacturing an electrode for a secondary battery having an electrode current collector either surface or both surfaces of which are coated with two active material layers, the method including the steps of: (i) preparing first electrode mixture slurry for forming a first layer of active material and coating the first electrode mixture slurry onto the electrode current collector, followed by drying; (ii) carrying out pressing to form the first layer of active material; (iii) forming craters in the first layer of active material; (iv) preparing second electrode mixture slurry for forming a second layer of active material and coating the second electrode mixture slurry onto the first layer of active material, followed by drying; and (v) carrying out pressing.

The craters may be formed by laser ablation.

Figure 1:
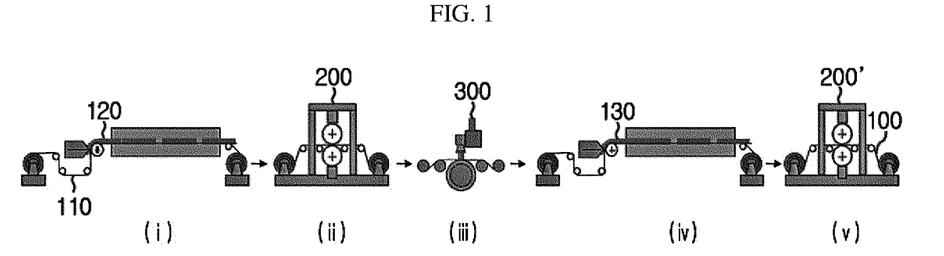
FIG. 1 is a schematic view illustrating the method for manufacturing an electrode according to an embodiment of the present disclosure.

FIG. 1 is a schematic view illustrating the method according to an embodiment of the present disclosure.

Referring to FIG. 1, in step (i), the first electrode mixture slurry is coated on one surface of a negative electrode current collector 110, followed by drying.

Next, in step (ii), pressing is carried out by using a roll press 200 to obtain the negative electrode current collector 110 having the first layer of active material formed thereon.

Then, in step (iii), the first layer of active material is subjected to laser ablation 300.

After that, in step (iv), the second electrode mixture slurry 130 is coated and dried, and then, in step (v), pressing is carried out by using a roll press 200 to form the second electrode active material layer.

When the electrode according to the present disclosure is a positive electrode, the positive electrode active material of each of the first layer and the second layer may independently include, but is not limited to: a layered compound such as lithium cobalt oxide ($LiCoO_2$) or lithium nickel oxide ($LiNiO_2$), or a compound substituted with one or more transition metals; lithium manganese oxide such as $Li_{1+x}Mn_{2-x}O_4$ (wherein x is 0-0.33), $LiMnO_3$, $LiMn_2O_3$ or $LiMnO_2$; lithium copper oxide ($Li_2CuO_2$); vanadium oxide such as $LiV_3O_8$, $LiFe_3O_4$, $V_2O_5$, $Cu_2V_2O_7$, or the like; Ni-site type lithium nickel oxide represented by the chemical formula of $LiNi_{1-x}M_xO_2$ (wherein M=Co, Mn, Al, Cu, Fe, Mg, B or Ga, and x=0.01-0.3); lithium manganese composite oxide represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); spinel-type lithium manganese composite oxide represented by the chemical formula $LiNi_xMn_{2-x}O_4$; $LiMn_2O_4$ in which a part of Li is substituted with alkaline earth metal ions; disulfide compound; $Fe_2(MoO_4)_3$, or the like.

When the electrode according to the present disclosure is a negative electrode, the negative electrode active material of each of the first layer and the second layer may independently include: carbon such as non-graphitizable carbon or graphite-based carbon; metal composite oxides, such as $Li_xFe_2O_3 (0 \le x \le 1)$, $Li_xWO_2 (0 \le x \le 1)$, $Sn_xMe_{1-x}Me'_yO_z$ (Me: Mn, Fe, Pb, Ge; Me': Al, B, P, Si, elements of Group 1, 2 or 3, halogen; $0 < x \le 1$; $1 \le y \le 3$; $1 \le z \le 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; lithium titanium oxide; or the like.

In addition to the above active materials, the first layer of active material and the second layer of active material of each of the negative electrode and the positive electrode may include a conductive material, binder, filler, or the like, and may further include other additives used conventionally in the art as necessary.

The conductive material may be used in an amount of 1-50 wt % based on the total ingredients forming the active material layer.

The conductive material is not particularly limited, as long as it has conductivity while not causing chemical reaction with the other elements of the battery. Particular examples of the conductive material include: graphite, such as natural graphite or artificial graphite; carbon black, such as carbon black, acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; metal oxides, such as titanium oxide; conductive materials, such as polyphenylene derivatives; or the like.

The binder is an ingredient which assists the binding of an active material with a conductive material, or the like, and the binding to a collector. In general, the binder is added in an amount of 1-50 wt % based on the total weight of the ingredients forming the active material layer. Particular examples of the binder include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber (SBR), fluororubber, various copolymer, or the like.

The filler is an ingredient inhibiting swelling of a positive electrode and is used optionally. The filler is not particularly limited, as long as it causes no chemical change in the corresponding battery and is a fibrous material. Particular examples of the filler include: olefin polymers, such as polyethylene or polypropylene; and fibrous materials, such as glass fibers or carbon fibers.

The thickness of each of the first layer of active material and the second layer of active material in the positive electrode and the negative electrode is not particularly limited, as long as it meets the objects of the present disclosure.

In general, the positive electrode current collector is provided with a thickness of 3-500 µm. The positive electrode current collector is not particularly limited, as long as it has high conductivity while not causing any chemical change in the corresponding battery. For example, it is possible to use stainless steel, aluminum, nickel, titanium, baked carbon, or aluminum or stainless steel surface treated with carbon, nickel, titanium, silver, etc. The current collector may have fine surface irregularities to increase the adhesion of the positive electrode active material thereto, and may have various shapes, such as a film, sheet, foil, net, porous body, foam, and non-woven body, or the like.

In general, the negative electrode current collector is formed to have a thickness of 3-500 µm. The negative electrode current collector is not particularly limited, as long as it has conductivity while not causing any chemical change in the corresponding battery. For example, it is possible to use copper, stainless steel, aluminum, nickel, titanium, baked carbon, copper or stainless steel surface treated with carbon, nickel, titanium, silver, etc., aluminum-cadmium alloy, or the like. In addition, like the positive electrode current collector, the negative electrode current collector may have fine surface irregularities to reinforce the binding force of the negative electrode active material thereto, and may have various shapes, such as a film, sheet, foil, net, porous body, foam, non-woven body, or the like.

In the method for manufacturing an electrode for a secondary battery according to the present disclosure, the first electrode mixture slurry is prepared.

To prepare the electrode mixture slurry, the first active material, conductive material, binder, filler and other optional additives are added to a solvent. The active material, conductive material, binder and filler are the same as described hereinabove. To prepare the first electrode mixture slurry, the active material selected as the first active material is added. To prepare the second electrode mixture described hereinafter, the second active material is added instead of the first active material.

Preferably, the solvent used for forming the electrode mixture slurry has a solubility parameter similar to that of the binder polymer and a low boiling point. This is because such a solvent allows homogeneous mixing and easy removal of the solvent. Non-limiting examples of the solvent include any one selected from the group consisting of acetone, tetrahydrofuran, methylene chloride, chloroform, dimethyl formamide, N-methyl-2-pyrrolidone (NMP) and cyclohexane, or a combination of two or more of them.

The first electrode mixture slurry is applied onto either surface or both surfaces of the electrode current collector by using a conventional coating method, such as dip coating, die coating, roll coating, comma coating or a combination thereof.

Then, the first electrode mixture slurry is dried at a temperature of 20-300° C. If desired, baking may be carried out at 300-800° C. under inert gas atmosphere, such as Ar or $N_2$.

Then, the first layer of active material formed as described above is pressed. When the first layer of active material is not pressed but the second electrode mixture slurry is applied thereon, the first layer of active material may be detached or separated while it is conveyed along the processing line. The pressing may be carried out by a method, such as roll press, used conventionally in the art. For example, the pressing may be carried out under a pressure of 0.1 Mpa-50 Mpa and/or at a temperature of 10-60° C.

If desired, the electrode having the first layer of active material formed thereon as described above may be wound and stored.

Then, craters are formed in the first layer of active material. The craters may be formed by laser ablation and may be formed uniformly throughout the whole surface of the first layer of active material.

Laser ablation removes materials from the surface under the effect of laser irradiation. For this purpose, according to a non-limiting embodiment, pulse laser irradiation having high output density may be used. Since heat conduction merely allows significantly slow transport in a thickness direction, irradiation energy is concentrated to the very thin layer of the surface. As a result, the surface is significantly heated and the materials rapidly evaporate or melt. To ensure sufficient absorption of laser beams, the wavelength of laser irradiation is selected as a function depending on the materials to be removed. During the process, processing gas or blowing gas may be guided onto the surface in order to discharge the removed materials or to prevent undesired chemical reactions on the surface. Even though the materials evaporate or melt, any harmful impurities are not produced.

Laser ablation is preferred in that it can be carried out as an in-line process during conveying. However, it is important to prevent deterioration, cracking and rupture of the active materials caused by laser ablation.

Particular examples of laser used for laser ablation include IR laser, eximer laser, YAG laser, $CO_2$ laser, or the like, but are not limited thereto. Various types of laser may be selected adequately depending on the particular types of active materials to be used, as long as the laser can form the craters while minimizing cracking or rupture of the active material.

In the laser ablation, a gas medium or solid-state medium may be used. The gas medium that may be used is selected from He—Ne, $CO_2$, Ar and eximer laser. The solid-state medium that may be used is selected from Nd:YAG, Nd:YV04 and ytterbium fibers.

In the laser ablation, the type, wavelength or output of laser beams may be adjusted to control the size, depth and/or pattern of the craters.

The laser beams may have a wavelength of 200-2,000 nm. For example, the laser beams may have a wavelength of 1.06 µm, 532 nm, 355 nm, 266 nm, 248 nm, or the like, but are not limited thereto.

In addition, the laser output may be at most 20 W, such as 0.1-20 W.

Further, the ablation may be carried out at a rate of at most 2,500 mm/s, such as 90-1,000 mm/s. The above-defined rate may be generated by conveying a laser ablation system or by conveying the electrode current collector having the first electrode active material formed thereon. When the laser ablation is carried out at the above-defined rate, it is possible to form the craters desirably in the active material layer, while minimizing deterioration, cracking and rupture of the active material caused by laser ablation.

The size of the ablation pattern formed in each of the active material layers of the positive electrode and the negative electrode and whether the electrode is cut or not may be contpressed by adjusting the laser output and rate merely. Laser irradiation with a high output in a short time is preferred in terms of the process. For example, the laser ablation may be carried out under an output of 20 W at a rate of 90-1,000 mm/s. When the laser ablation is carried out within the above-defined range, laser irradiation is carried out in an adequate dose to the same point and the problem of cutting of an electrode is not generated.

Additionally, soft ablation may be carried out by contpressing the frequency of laser beams to 100-1000 kHz.

Then, the second electrode mixture slurry is prepared, applied to the first layer of active material, dried and pressed to form the second layer of active material. The application, drying and pressing of the second electrode mixture slurry are the same as the above description about those of the first electrode mixture slurry. The same or different methods may be used for the first electrode mixture slurry and the second electrode mixture slurry.

In still another aspect of the present disclosure, there is provided a secondary battery, particularly a lithium secondary battery, including the electrode.

The lithium secondary battery may include an electrode assembly having a positive electrode, a negative electrode and a separator interposed between both electrodes, and a lithium salt-containing electrolyte injected thereto.

The separator is interposed between the positive electrode and the negative electrode, and an insulating thin film having high ion permeability and mechanical strength is used as separator. The separator may have a pore diameter of 0.01-10 µm and a thickness of 5-300 µm. Particular examples of the separator include: olefin polymers, such as chemically resistant and hydrophobic polypropylene; sheets or non-woven webs made of glass fibers or polyethylene; or the like. When a solid electrolyte, such as a polymer, is used as an electrolyte, the solid electrolyte may also function as a separator.

The lithium salt-containing electrolyte may include an electrolyte and a lithium salt, and the electrolyte may include a non-aqueous organic solvent, organic solid electrolyte, inorganic solid electrolyte, or the like, but is not limited thereto.

Particular examples of the non-aqueous electrolyte include aprotic organic solvents, such as N-methyl-2-pyrrolidinone, propylene carbonate (PC), ethylene carbonate (EC), butylene carbonate, dimethyl carbonate (DMC), diethyl carbonate (DEC), ethyl methyl carbonate (EMC), gamma-butyrolactone, 1,2-dimetnoxyethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, triphosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Particular examples of the organic solid electrolyte include polyethylene derivatives, polyethylene oxide derivatives, polypropylene oxide derivative, phosphate polymers, poly-agitation lysine, polyester sulfide, polyvinyl alcohol, polyvinylidene fluoride, polymers containing an ionic dissociatable group, or the like.

Particular examples of the inorganic solid electrolyte include nitrides, halides and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like.

The lithium salt is a material easily soluble in the non-aqueous electrolyte, and particular examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylate, lithium tetraphenylborate, imide, or the like.

In addition, in order to improve charging/discharging characteristics, flame resistance, or the like, it is possible to add pyridine, triethyl phosphite, triethanol amine, cyclic ether, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride, or the like, to the non-aqueous electrolyte. Optionally, in order to impart incombustibility, a halogen-containing solvent, such as carbon tetrachloride or ethylene trifluoride, may be further added. In order to improve high-temperature storage characteristics, carbon dioxide gas may be further added. Fluoroethylene carbonate (FEC), propene sultone (PRS), etc. may also be further added.

According to an embodiment, a lithium salt, such as $LiPF_6$, $LiClO_4$, $LiBF_4$ or $LiN(SO_2CF_3)_2$, may be added to a mixed solvent of a cyclic carbonate, such as EC or PC, as a high-dielectric solvent with a linear carbonate, such as DEC, DMC or EMC as a low-viscosity solvent, thereby providing a lithium salt-containing non-aqueous electrolyte.

In yet another aspect, there is provided a battery module including the secondary battery as a unit cell, and a battery pack including the battery module.

The battery pack may be used as an electric power source for devices requiring high-temperature stability, long cycle characteristics and high rate characteristics.

Particular examples of such devices may include but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be explained in more detail. The following examples may, however, be embodied in many different forms and should not be construed as limited to the exemplary embodiments set forth therein. Rather, these exemplary embodiments are provided so that the present disclosure will fully convey the scope of the present disclosure to those skilled in the art.

EXAMPLES

Example 1

Artificial graphite, Super-P, carboxymethyl cellulose and SBR were mixed with N-methyl pyrrolidone at a weight ratio of 95.8:1:1.2:2 to obtain a first negative electrode mixture slurry. Next, the negative electrode slurry was coated onto copper foil to a thickness of 14 pm to form a thin electrode plate. Then, the electrode plate was dried at 135° C. for 3 hours or more to form a first negative electrode active material layer.

Laser ablation was carried out on the first negative electrode active material layer. The laser used herein was IR laser having an output of 20W and a rate of 2500 mm/s.

Then, $Li_{1.33}Ti_{1.67}O_4$ (particle diameter: 10 μm), carbon black and PVdF were mixed with N-methyl pyrrolidone at a weight ratio of 92:4:4 to obtain a second negative electrode mixture slurry. The second negative electrode mixture slurry was coated onto the first layer of negative electrode active material to form a thin electrode plate.

Figure 3A:
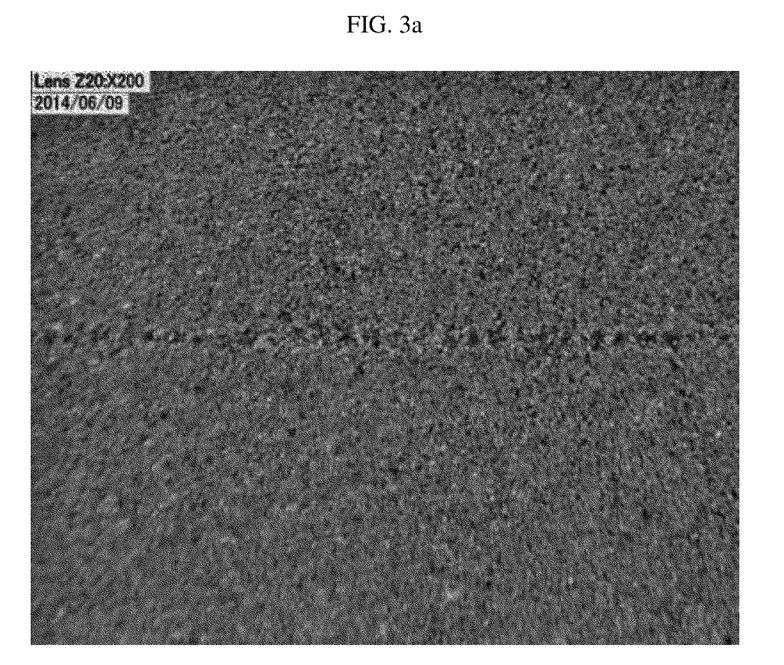
FIG. 3a and FIG. 3b are images taken from the section of the electrode according to an embodiment of the present disclosure.

FIG. 3a shows a sectional image of the negative electrode obtained from Example 1. The interface between the first layer of active material and the second layer of active material can be seen from FIG. 3a.

Example 2

Figure 3B:
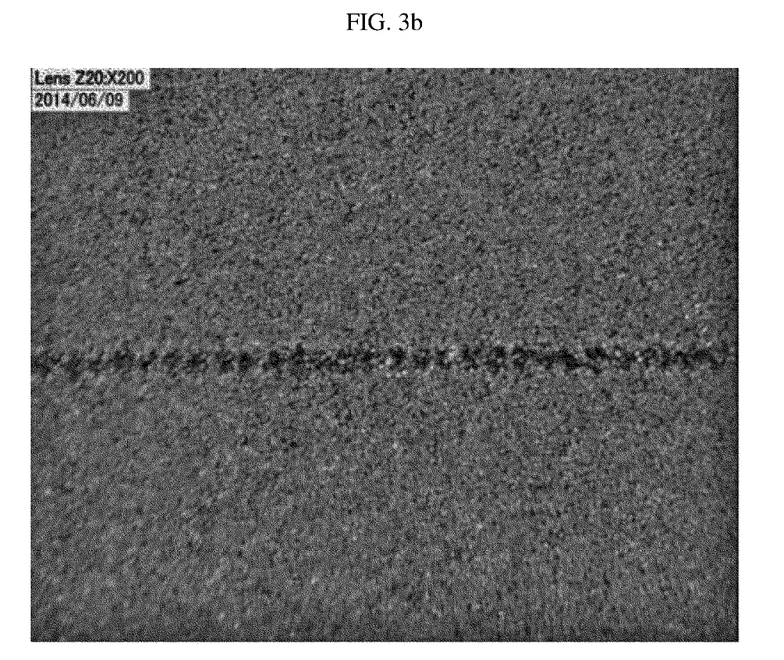

A negative electrode was obtained in the same manner as Example 1, except that the laser ablation was carried out with an output of 4 W at a rate of 2500 mm/s. FIG. 3b shows a sectional image of the negative electrode obtained from Example 2. The interface between the first layer of active material and the second layer of active material can be seen from FIG. 3b.

What is claimed is:

1. An electrode for a secondary battery having an electrode current collector either surface or both surfaces of which are coated with two active material layers, the electrode comprising:
   an electrode current collector; a first layer of active material coated on the current collector; and a second layer of active material coated on the first layer of active material, wherein a second average particle diameter of the active material forming the second layer of active material is larger than a first average particle diameter of the active material forming the first layer of active material, with a ratio of the first average particle diameter to the second average particle diameter being from 1:9 to 5:5.1, and
   wherein a plurality of craters are formed in the first layer of active material by laser ablation and the craters are filled with active material of the second layer.

2. The electrode for a secondary battery according to claim 1, wherein the craters have a diameter of 2-60 μm.

3. The electrode for a secondary battery according to claim 1, wherein the craters have a depth of 2-60 μm.

4. The electrode for a secondary battery according to claim 1, wherein the craters have a semi-spherical shape or a flower-like shape having a plurality of petals.

5. The electrode for a secondary battery according to claim 1, wherein the craters occupy 1-50% of the surface area of the first layer of active material.

6. A method for manufacturing an electrode for a secondary battery having an electrode current collector either surface or both surfaces of which are coated with two active material layers, the method comprising the steps of:
   (i) preparing a first electrode mixture slurry for forming a first layer of active material and coating the first electrode mixture slurry onto the electrode current collector, followed by drying;
   (ii) carrying out pressing to form the first layer of active material;
   (iii) forming craters in a surface of the first layer of active material by melting or evaporating the active material at discrete locations on the surface of the first layer via laser ablation;
   (iv) preparing second electrode mixture slurry for forming a second layer of active material and coating the second electrode mixture slurry onto the first layer of active material, followed by drying; and
   (v) carrying out pressing to form the second layer of active material, wherein at least a portion of the second layer of active material is received within some of the craters in the first layer of active material[H] wherein a second average particle diameter of the active material forming the second layer of active material is larger than a first average particle diameter of the active material forming the first layer of active diameter being from 1;9 to 5;5.1.

7. The method for manufacturing an electrode for a secondary battery according to claim 6, wherein the laser is IR laser, eximer laser, YAG laser or $CO_2$ laser.

8. The method for manufacturing an electrode for a secondary battery according to claim 6, wherein the laser has an output of 0.1-20 W.

9. The method for manufacturing an electrode for a secondary battery according to claim 6, wherein the laser ablation is carried out at a speed of 2,500 mm/s or less.

10. The method for manufacturing an electrode for a secondary battery according to claim 6, wherein the steps are performed along a processing line in which the electrode current collector is conveyed between sequential locations along the processing line where the respective steps are performed.

11. The method for manufacturing an electrode for a secondary battery according to claim 10, wherein the step of forming craters via laser ablation is performed at a first one of the sequential locations while the electrode current collector with the first layer of active material thereon is conveyed towards a second one of the sequential locations where the coating of the second electrode mixture slurry onto the first layer of active material is performed, the coating of the second electrode mixture slurry onto the first layer of active material being performed at the second location while the electrode current collector with the first layer of active material thereon is being conveyed.

12. The method for manufacturing an electrode for a secondary battery according to claim 6, wherein the ratio of the first average particle diameter to the second average particle diameter is from 1:1.625 to 1:4.

13. The method for manufacturing an electrode for a secondary battery according to claim 6, wherein a press density ratio of the first layer of active material to the second layer of active material is from 1.1:1 to 3:1 under a pressure of 12-16 Mpa.

14. The method for manufacturing an electrode for a secondary battery according to claim 6, wherein the craters are formed to define a shape having a central region with a plurality of lobes extending radially outwardly therefrom.

15. The electrode for a secondary battery according to claim 1, wherein the ratio of the first average particle diameter to the second average particle diameter is from 1:1.625 to 1:4.

16. The electrode for a secondary battery according to claim 1, wherein a press density ratio of the first layer of active material to the second layer of active material is from 1.1:1 to 3:1 under a pressure of 12-16 Mpa.

\* \* \* \* \*